Figure 1:
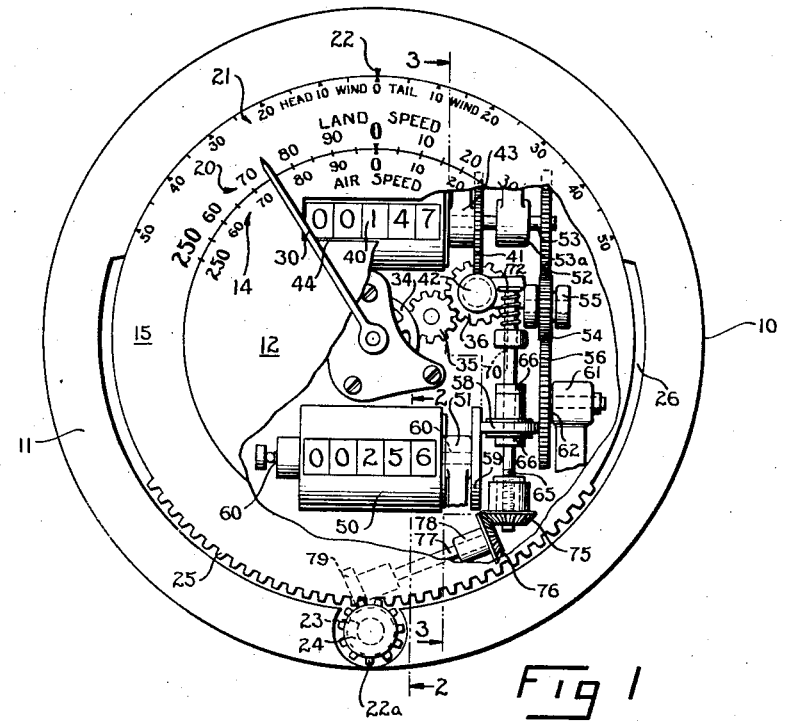

Oct. 3, 1939.  E. L. VAIL  2,174,608

INDICATING INSTRUMENT

Original Filed Jan. 14, 1937

INVENTOR.
Edgar L. Vail
BY F. Bascom Smith
ATTORNEY.

Patented Oct. 3, 1939

2,174,608

UNITED STATES PATENT OFFICE 2,174,608

INDICATING INSTRUMENT

Edgar L. Vail, New York, N. Y., assignor to Jaeger Watch Company, Inc., New York, N. Y., a corporation of New York Original application January 14, 1937, Serial No. 120,537. Divided and this application April 11, 1938, Serial No. 201,308

3 Claims. (Cl. 116—129)

This invention relates to instruments for indicating speed and distance, and more particularly to an instrument for use in aircraft or the like for indicating speed and distance with respect to the surrounding air and with respect to ground.

This application is a division of my copending application, Serial No. 120,537, filed January 14, 1937, for Instrument.

Indicating instruments which are commonly used in aircraft, for example, are capable of indicating only the speed of the craft with respect to the surrounding air, and it is only by mental calculations that the pilot can determine the ground speed. Hence, it is desirable to provide an instrument which indicates the true ground speed as well as the air speed. Such a device, however, to be most useful to the pilot, must be so designed that the various scales are located in a convenient position and are easily read and interpreted without the necessity for any mathematical calculations. Furthermore, any adjustment mechanism must be simple and readily accessible inasmuch as the adjustment must be effected by the pilot while in flight and at irregular periods in accordance with data received from the ground.

It is accordingly an object of the present invention to provide a novel instrument of the above type which is simple and light in construction, convenient to adjust and read and dependable in operation.

Another object is to provide such a novel instrument which may be readily set or adjusted to compensate for different wind velocities so as to indicate the true ground speed.

Another object is to provide a novel instrument of the above type in which both the air speed and ground speed are indicated on concentrically located scales. Various other objects will be apparent as the nature of the invention is more fully disclosed.

A feature of the invention consists in the provision, in an instrument of the above type, of a scale which may be shifted with respect to a pointer by an amount proportional to the wind velocity so that the corrected reading represents the true ground speed.

Another feature consists in the provision of two adjacent scales which register with the same pointer, one scale being stationary and being graduated to indicate the air speed and the other scale being adjustable and being graduated to indicate the ground speed.

Another feature consists in the provision of a wind velocity scale and an adjusting knob by which the movable scale may be easily adjusted to compensate for various wind velocities.

Various other features consist in the combinations of parts and details of construction hereinafter more fully set forth.

In one embodiment of the invention, the instrument comprises a standard mechanical or electrical tachometer driven by a propeller which is mounted on the vehicle in the outside medium as, for example, on the strut of the aircraft or, in the case of a water-borne vessel, is mounted in the surrounding water, in a position to be driven at a speed proportional to the speed of the craft through the medium. The tachometer actuates a conventional speedometer mechanism equipped with a pointer which is movable over a scale to indicate the air speed and also drives an odometer which integrates the speed to indicate the total distance or mileage with respect to the air. In accordance with the present invention, a second scale is mounted concentric with the first scale in a position to register with the same pointer. The second scale is also graduated to indicate speed and is associated with a scale graduated in accordance with wind velocity. Means is provided for shifting the second scale in accordance with the known wind velocity by an amount adapted to compensate for the change in ground speed caused by the wind. In this way, a true ground speed indication is obtained.

Preferably, the instrument also includes a second odometer which is driven from the first odometer through a variable speed gear train, the ratio of which is adjustable in accordance with the movement of the adjustable scale to cause the second odometer to compensate for the wind velocity and to indicate the true ground miles flown.

Although the novel features which are believed to be characteristic of this invention are pointed out more particularly in the claims appended hereto, the broader aspects of the invention will be better understood by referring to the following description, taken in connection with the accompanying drawing, in which one embodiment of the invention has been set forth for purposes of illustration only.

Figure 3:
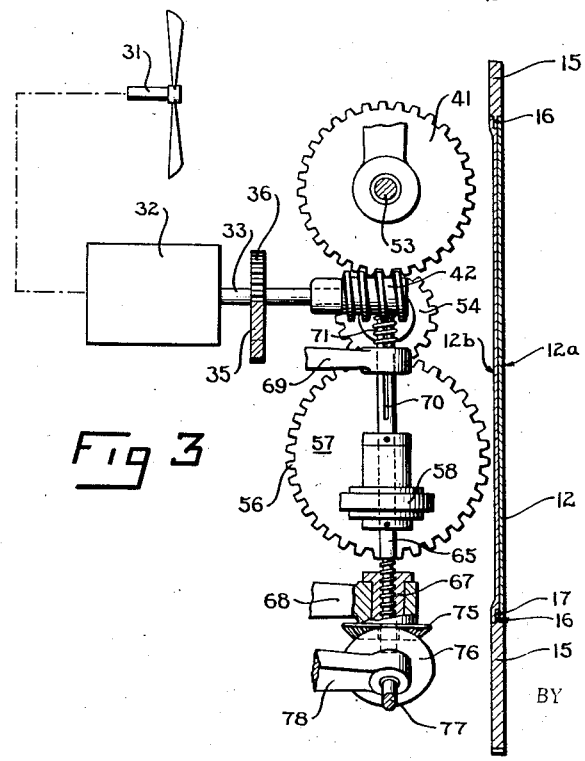
Figure 2:
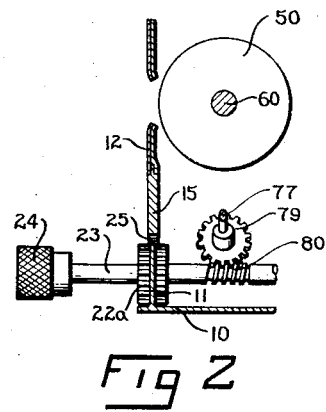

In the drawing, Fig. 1 is a front elevation, partly in section, of an indicating instrument constructed in accordance with this invention;

Fig. 2 is a section taken on the line 2—2 of Fig. 1 showing the position of the adjusting knob and associated mechanism; and, Fig. 3 is a section taken on the line 3—3 of Fig. 1 showing the various details of construction.

Referring to the drawing more in detail, the instrument is shown as having a casing 10 provided with an outer peripheral flange 11 and a central circular plate 12 which is secured thereto by suitable means, such as screws, not shown. The plate 12 is provided at its periphery with a scale 14 graduated to cooperate with a pointer 30 for indicating air speed in suitable units, such as miles per hour. In the example shown, the scale 14 is graduated to read from zero to 300 miles per hour, although it is to be understood that various other designations may be employed, depending upon the particular purpose of the instrument.

For indicating the ground speed, there is provided a movable ring 15 which is adjustable about the periphery of the plate 12. As shown more in detail in Fig. 3, the ring 15 may be provided with an inner flange 16 which seats in a recess 17 formed at the periphery of the plate 12. The plate 12 is shown as formed by two discs 12a and 12b which are separated at their periphery to form the recess 17. It is obvious, however, that other suitable constructions can be used to provide an arrangement such that the ring 15 is supported by and is slidable around the periphery of the plate.

The ring 15 is provided with a scale 20 having graduations similar to the scale 14 and being adapted to cooperate with the pointer 30 for indicating ground speed in the manner to be pointed out. The outer periphery of the ring 15 may be provided with a scale 21 which is graduated to read wind velocity and registers with an index point 22 formed on the outer flange 11 of the casing. The scale 21 is graduated in both directions from a zero point so as to indicate the velocity of either a head wind or tail wind, as will be described. It is to be understood that the scale 21 can be formed on the stationary flange 11 instead of on the ring 15, if desired, index 22 then being formed on the ring 15.

For actuating the ring 15, there is provided a gear 22a carried upon a shaft 23 which is provided with an operating handle, such as a knurled knob 24, in a readily accessible position at the front of the casing. The gear 22a meshes with a rack 25 formed on the outer periphery of the ring 15 and extending a sufficient distance around the ring to provide for the desired movement thereof. The flange 11 is provided with an arcuate recess 26 which provides clearance for the rack 25 and forms a stop to engage the rack when the ring 15 reaches its extreme positions so as to limit the movement thereof.

For actuating the pointer 30, there is provided suitable mechanism responsive to speed of movement through the surrounding medium. In the embodiment shown, this mechanism comprises a propeller 31 which is positioned in the surrounding medium, as, for example, on the strut of the aircraft, and is connected by suitable remote control mechanism to a standard tachometer 32 which may be either of the mechanical or electrical types and includes a mechanism, not shown, for driving a shaft 33 at a speed proportional to the speed of rotation of the propeller 31. This shaft 33 drives a standard speedometer mechanism 34 (Fig. 1) through a gear train shown as an idler gear 35 and a gear 36 meshing therewith and carried by the shaft 33. The speedometer mechanism 34 is adapted to cause a deflection of the pointer 30 which is proportional to the speed of rotation of the driving mechanism and, consequently, proportional to the speed of movement of the craft through the surrounding medium.

For integrating the air distance flown, there is provided an odometer 40 of standard construction and driven by a gear 41 meshing with a worm 42 mounted on the shaft 33, the gear ratio being such that the odometer registers the distance flown in suitable units, such as in miles. The odometer 40 is supported by a suitable means, such as a bracket 43, carried by the casing 10, and is visible through an aperature 44 formed in the plate 12.

For indicating the ground miles, or distance travelled with respect to ground, there is provided a second odometer 50 which is supported by a bracket 51 mounted on the casing 10 and is visible through a suitable aperture, not shown, in the plate 12. This second odometer 50 is driven from the shaft 33 by a gear train including a variable speed device. In the embodiment shown, this gear train comprises a gear 52 mounted upon the shaft 53 of the odometer 40, said shaft being supported in a suitable bracket 53a.

The gear 52 drives an idler gear 54 mounted in a bracket 55, which meshes with teeth 56 formed on the periphery of a friction disc 57. The friction disc 57 drives a friction wheel 58 driving a second friction disc 59 which is mounted upon the shaft 60 of the odometer 50 and causes actuation of said odometer. The disc 57 is mounted on a bracket 61 and may be held in frictional engagement with the wheel 58 by a spring 62 which is adapted to prevent slippage and to compensate for wear of the parts.

In order to permit control of the variable speed mechanism to compensate for the wind velocity, the friction wheel 58 is mounted for rotation upon a shaft 65 between collars 66 which are pinned to said shaft. The shaft 65 is threaded in a rotatable bushing 67 journalled in a bracket 68 and is keyed for axial movement in a bracket 69 by means of a key-way 70. A spring 71, seated around the shaft 65 between the bracket 69 and a collar 72 formed on said shaft, tends to hold the shaft in a given set position and to eliminate lost motion.

The bushing 67 is provided with a bevelled gear 75 meshing with a second bevelled gear 76 carried upon a shaft 77 which is mounted in a bracket 78. The shaft 77 carries a worm wheel 79 meshing with a worm gear 80 formed on or secured to the shaft 23, the arrangement being such that rotation of the bushing 67, produced by turning movement of the handle 24, causes the shaft 65 to move axially and thereby shifts the friction wheel 58 radially of the friction discs 57 and 59 so as to change the ratio between the speeds of said discs.

In the operation of the above-described embodiment, the ring 15 is adjusted manually in accordance with the scale 21 and the index mark 22 to compensate for the wind velocity. In the position shown in Fig. 1, the scale 21 is set to indicate zero wind velocity. It is evident, however, that it will be shifted clockwise or counterclockwise by an amount dependent upon the speed and direction of the wind, which data is obtained from the ground at regular intervals by the pilot. When the ring 15 is thus adjusted, the pointer 30 indicates the air speed on the scale 14 and the ground speed on the scale 20. Both of these indications are readily observable at the same time by the pilot. Consequently, he has accurate knowledge of both the air and ground speeds without making any mental calculations.

At the same time, the odometer 40, which is driven by the shaft 33 in accordance with the number of revolutions of the propeller 31, indicates the miles flown with respect to the surrounding air.

The setting of the ring 15 by manipulation of the knob 24 also causes longitudinal movement of the friction wheel 58 through the mechanism above described and thereby varies the speed ratio between the odometer 50 and the odometer 40. The ratio of the various gears is such that this change in speed of the odometer 50 compensates for the wind velocity. Consequently, the odometer 50 is made to indicate the actual ground miles flown. The pilot thus has available an indication of the actual distance covered as well as the air and ground speeds and the air miles flown. This distance indication is particularly useful, for example, in blind flying and shows the pilot, without the necessity of mental calculations, when he has covered the proper distance to reach his destination.

It will be noted that the construction above-described provides a simple and dependable indicating instrument which makes the various readings simultaneously available to the pilot. Furthermore, the adjustment is simple and can be readily effected in flight in accordance with changes in the known wind velocity. The same adjustment actuates both the ground speed scale and the ground mile odometer and can be made without appreciably diverting the pilot's attention from his other duties.

Although a particular embodiment of the invention has been shown for purposes of illustration, it is to be expressly understood that the invention is capable of various uses and that various changes and modifications may be made therein as will be apparent to a person skilled in the art. The instrument has been described, for simplicity, as applied to an aircraft. It is evident, however, that it is also applicable to waterborne vessels and the claims are to be interpreted accordingly. The invention is only to be limited in accordance with the following claims when interpreted in view of the prior art.

What is claimed is:

1. In an indicating instrument, a casing, a stationary disc mounted thereon having a peripheral groove formed therein, a ring having an inner flange seated in said groove to permit relative rotational movement, a rack formed on a portion of the periphery of said ring, a pinion engaging said rack to adjust the position of said ring, and an arcuate recess in said casing to provide clearance for said rack, the ends of said recess forming stops to engage said rack for limiting the movement of said ring.

2. In an indicating instrument, a casing, a stationary disc mounted thereon, a ring journalled about the periphery of said disc, a rack formed on a portion of the periphery of said ring, a pinion engaging said rack to adjust the position of said ring, and an arcuate recess in said casing to provide clearance for said rack, the ends of said recess forming stops to engage said rack for limiting the movement of said rack.

3. In an indicating instrument, a casing having an arcuate recess formed therein, a dial fixed to said casing, a ring journalled about said dial, a scale formed on the face of said ring, a rack formed on a portion of the periphery of said ring, a pinion engaging said rack to adjust the position of said ring, said ring having the motion thereof limited by the ends of the recess in said casing, and a pointer adapted to give concurrent indications on said dial and said scale.

EDGAR L. VAIL.